Aug. 9, 1938.                H. G. PACK                2,126,656
                        THERMOELECTRIC CONVERTER
                          Filed Oct. 1, 1935            3 Sheets-Sheet 1
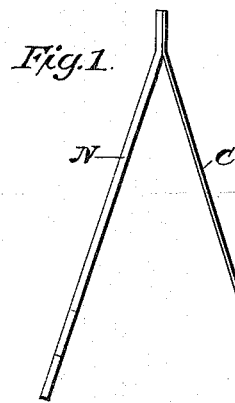
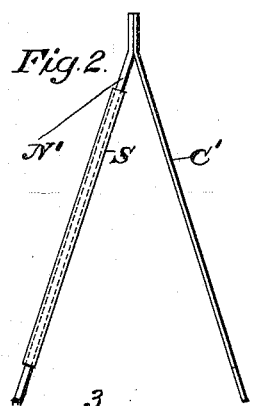
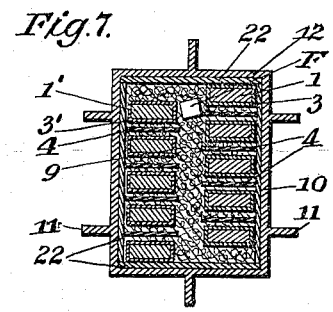
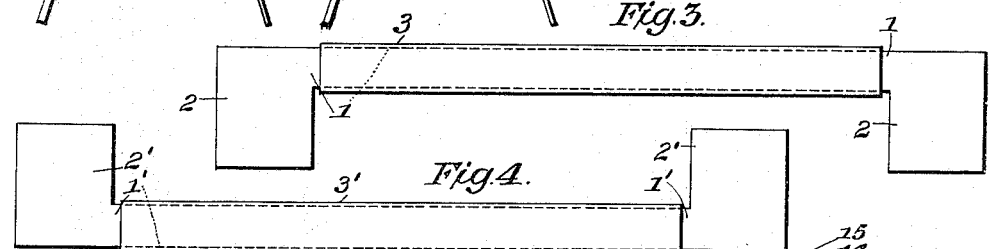
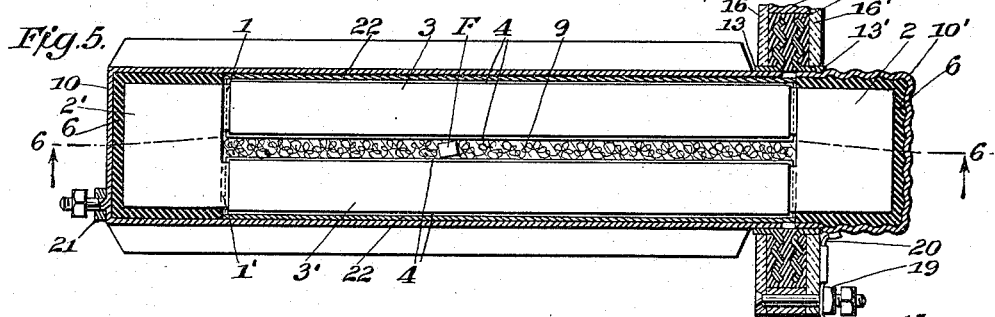
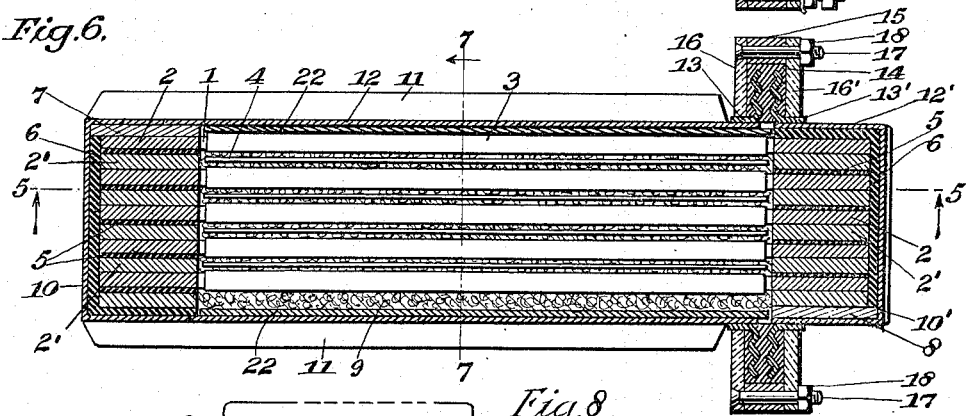
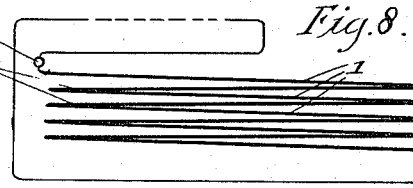
WITNESSES                                               INVENTOR
Edw. Thorpe                                             H. G. Pack
A. L. Kitchin                                    BY Munn, Anderson & Liddy
                                                        ATTORNEYS Aug. 9, 1938. H. G. PACK 2,126,656
THERMOELECTRIC CONVERTER
Filed Oct. 1, 1935 3 Sheets-Sheet 2
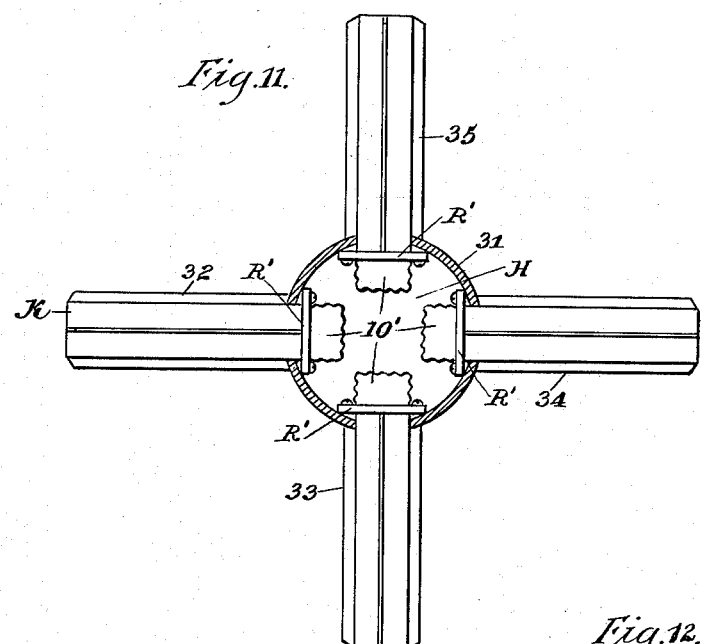
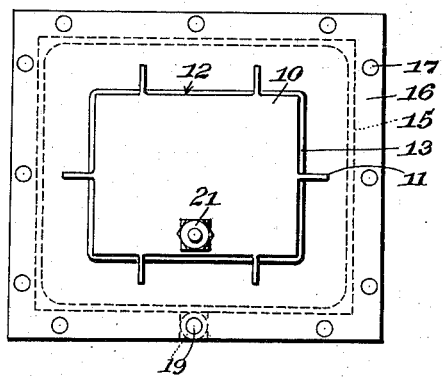
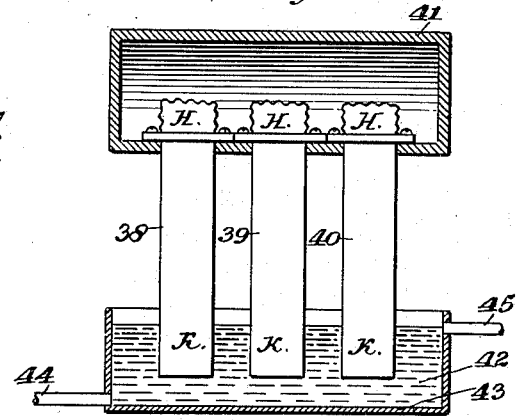
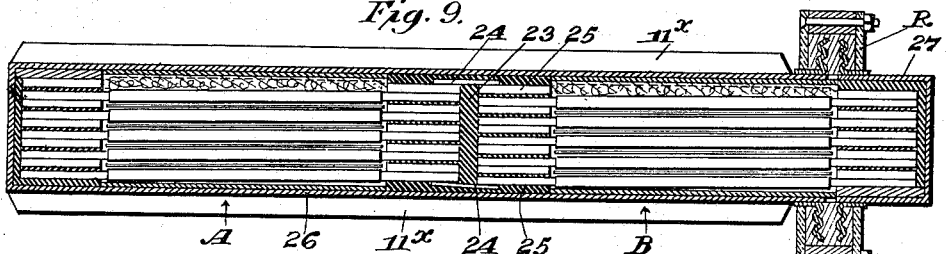
WITNESSES
Edw. Thorpe
A. L. Kitchin
INVENTOR
H. G. Pack
BY
Munn, Anderson & Liddy
ATTORNEYS Aug. 9, 1938. H. G. PACK 2,126,656
THERMOELECTRIC CONVERTER
Filed Oct. 1, 1935 3 Sheets-Sheet 3
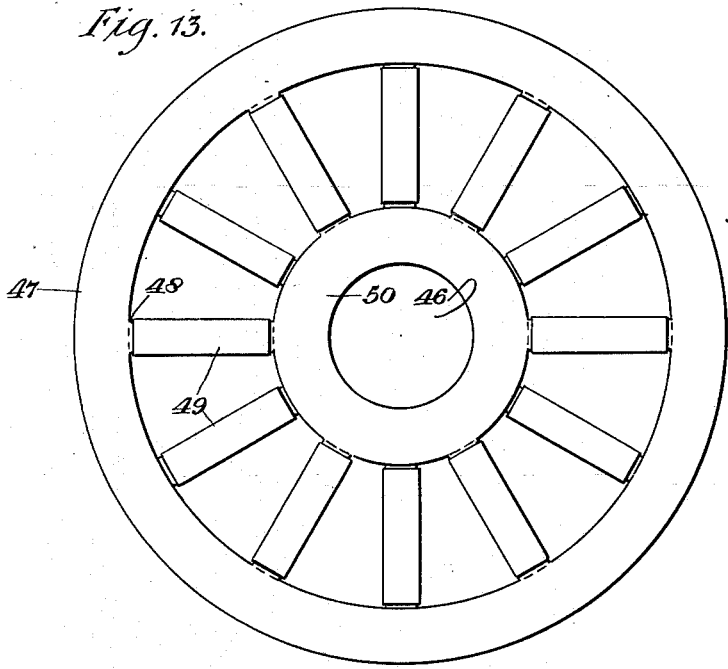
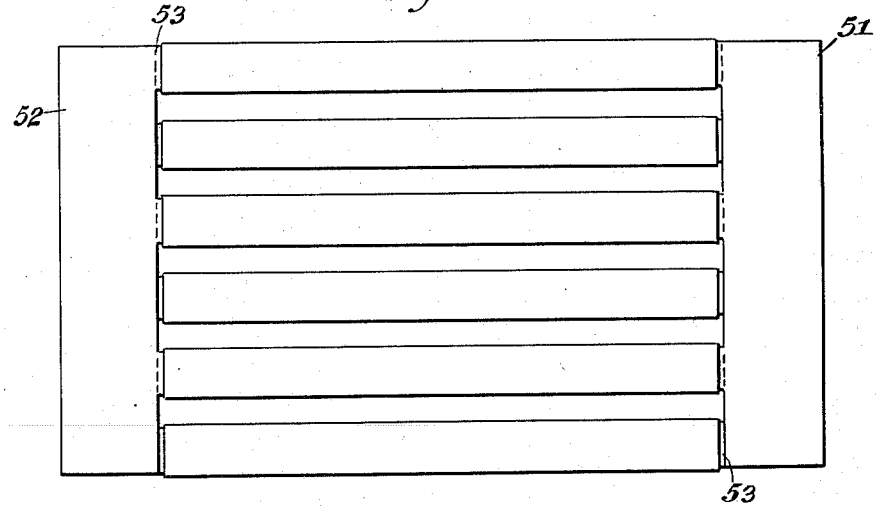
WITNESSES
Edw. Thorpe.
A. L. Kitchin.
INVENTOR
H. G. Pack
BY
Munn, Anderson & Leddy.
ATTORNEY Patented Aug. 9, 1938

2,126,656

UNITED STATES PATENT OFFICE 2,126,656

THERMOELECTRIC CONVERTER

Herschel G. Pack, Salt Lake City, Utah

Application October 1, 1935, Serial No. 43,126

12 Claims. (Cl. 136—4)

This invention relates to an apparatus for converting thermal energy into electrical energy, and has for an object to provide an improved construction wherein this conversion may be done efficiently.

Another object is to provide an apparatus for converting heat into electricity wherein the parts are formed and assembled in such a manner as to withstand rough usage at all times.

Another object of the invention is to provide a converter for converting heat into electrical energy wherein a comparatively high heat may be utilized without injuring the device.

An additional object is to provide a thermoelectric converter wherein a plurality of units are assembled in a form to give a maximum current in a minimum space through especially formed elements adapted to permit the ready transmission of electricity and the ready radiation of heat, so that in use the respective ends of the apparatus may be maintained at an appreciable difference in temperature.

An additional and further object is to provide a converter wherein the parts may be formed as single units or as multiple units so as to increase the output of the apparatus.

My invention is illustrated in the accompanying drawings forming part of this application, in which:

Figure 1 is an edge view of a pair of mating thermocouple elements for equalizing electrical and thermal conductivities;

Figure 2 is a similar view showing the use of a conducting coating;

Figure 3 is a plan view of one of the thermal units;

Figure 4 is a plan view of the mating thermal unit to that shown in Fig. 3;

Figure 5 is a horizontal sectional view through a thermoelectric converter ready for use, the same being taken approximately on the line 5—5 of Fig. 6;

Figure 6 is a vertical sectional view through Fig. 5 approximately on the line 6—6;

Figure 7 is a sectional view on the line 7—7 of Fig. 6;

Figure 8 is a diagram showing the circuit of the converter illustrated in Fig. 5;

Figure 9 is a vertical sectional view through two assemblies of units in one casing;

Figure 10 is an end view of the converter shown in Fig. 5;

Figure 11 is a top plan view of a series of converters arranged in a single holder through which heat is adapted to be projected for heating one end of the respective converters;

Figure 12 is a sectional view showing converters positioned with one end in a heating apparatus and the other end in a cooling apparatus;

Figure 13 is a plan view of a stack of elements similar to that shown in Figs. 1 and 2 except that they are formed round;

Figure 14 is a view of a stack of elements similar to that shown in Figs. 1 and 2 except that they are multiple there being three cross bars for each element instead of one shown in Fig. 1.

It has been long known that two dissimilar metal bars joined together at one end, the other ends being free, will produce an electric current when the junction of the two metals is heated. The current of a thermo-couple thus produced depends upon the nature of the elements used. There are elements which tend to form good combinations but in which one of them may be a relatively poor conductor. The ohmic resistance of one of the elements of a thermo-couple may tend to cut down unduly the effective current produced because of the heat loss. The electrical and thermal conductivity of two mating thermo-couple elements may be equalized however. Thus in Fig. 1 I have shown two mating elements, one of which may be nickel as shown at N, and the other of copper, as indicated at C. In this instance, the nickel element which has less electrical and thermal conductivity than copper is made of a thicker strip. Another means of equalizing the electric and thermal conductivity is to provide a conducting coating on that element which has relatively poor conductivity.

In Fig. 2 I have shown two elements N' and C', the poorer conductor N' may be made thinner than the corresponding element N of Fig. 1 if it has a metallic coating such as that shown at S. This coating may be gold, silver, copper or any other metal which is a good conductor of electricity. These coatings may be electroplatings or they may be thin metallic sheets secured in place in any desired manner.

The device which forms the subject of this invention makes use of elements which have the coatings for equalizing the thermal and electric conductivity in conjunction with the other means for increasing the thermal conductivity at certain portions of the device and provides thermal insulation at other portions.

Referring to Figs. 3 and 4 I have shown therein mating elements of a thermo-couple. In Fig. 3, 1 indicates a strip which is preferably made of an alloy of bismuth and vanadium. Each end of this strip is enlarged as shown at 2, the purpose of this enlargement being to cut down the ohmic resistance where the two elements are joined together. The conducting coating is shown at 3.

In Fig. 4 I have indicated the mating element for that shown in Fig. 3 in which the strip 1' has enlarged ends 2' oppositely directed to those of the strip 1 in order that when joined together the ends may overlap. The conducting coating is shown at 3'.

In making the assembly, the elements are placed as indicated in Figs. 5 and 6 in which it will be observed that the elements are alternated, that is to say, one end of one element is in contact with the end of the adjacent element while the opposite end of the adjacent element is in contact with the next succeeding element.

The ends 2 and 2' register accurately while the respective strips or bars 1 and 1' are offset as shown in Fig. 5. Thin strips of mica or equivalent insulating material 4 are disposed between one element and that above it, so as to prevent short circuiting. These strips also provide some thermal insulation between the elements and a great deal longitudinally. Insulation is provided between the registering metal joints, such insulation being shown at 5. This may be mica or other desired insulating material but it has been found that an insulating cement acts efficiently in its place. A cement formed of fused and finely powdered magnesium oxide may be used, but the cement which is preferably used is one made of alumina or magnesia mixed with a bond of clay. The former requires drying and the latter the addition of heat to set properly. One important feature of cements of this type is that while they are good electrical insulators, they do transmit heat and this adds to the efficiency of the unit, as will be explained later.

The same kind of cement is used in insulating the ends of the units, as shown at 6. This cement, as will be observed from Figs. 5 and 6, extends on three sides of the end portions made by the superposed enlarged ends 2 and 2' and the interposed insulation 5. As will be seen from Fig. 6, the upper element is in contact with a metallic plate 7 at the left end of the figure, while the element at the bottom is in contact with a metallic plate 8 at the right hand side of the figure, thus making electrical contact with the shells 10 and 10' respectively.

Disposed between the opposed elements is a filling 9 of loosely packed asbestos, mineral wool, or the equivalent. This fills the space between the elements as stated, and at the same time holds in place the insulating strips 4. In the space between the elements, as shown in Fig. 7, is disposed one or more blocks of charcoal F, the purpose of which is to absorb any air or gas inside the shell after it is sealed, as described later.

The shell consists of a rectangular metallic box or casing 10 having radiating fins 11. The casing is open at the top to receive the assembled elements, and is then closed by a cover 12. This cover is arranged to fit just within the open end of the casing 10, and pressure is used to force the cover down upon the ends of the assembled elements. While the cover is under compression it is welded in place, and the projecting side end walls are cut away flush with the cover, thus presenting the appearance shown in Fig. 6, and leaving the ends of the elements and the layers of insulation between them under compression. The compression of the cement in the ends makes it more dense, and thus increases the thermal conductivity.

The casing 10 has an extension 10' which encloses that end of the assembled joints that is to be heated. In order to absorb a maximum quantity of heat, the extension 10' of the casing 10 is corrugated and a cover portion 12' is affixed thereto, the elements on this end which are enclosed by the extension being compressed and the lid of cover 12' being welded after compression. The extension 10', it will be observed, is separated from the casing 10, but is secured thereto by an insulating ring which is made as follows:

Two spaced apart metal bands 13 and 13' provided with corrugated flanges are embedded in a molded ring-shaped block 14. The block is molded from thermal and electrical insulating material, for example, a cement composed of powdered asbestos and powdered magnesia mixed with a solution of water glass. In addition to the block 14 I make use of a surrounding ring 15 of hard asbestos board or the like providing thermal and electrical insulation. Two annular insulating members 16 and 16' are provided, these annular members being of ceramic material like isolantite, or porcelain like that used for automobile spark plugs. These rings are mechanically strong and withstand high temperatures, and also the action of expansion and contraction due to heating and cooling. This assembly of rings is bound together by a plurality of bolts 17 and nuts 18.

The whole complete insulating ring assembly is made separate and independent from the rest of the converter. The last step in assembling virtually consists in slipping the complete ring over the end of the shell and welding the flange 13 to the container and the flange 13' to the extension, as shown in Figs. 4 and 6, whereby the main container and the extension are firmly secured together, but are electrically separated, and the thermal connection between the main casing and the extension is very poor. One purpose of this insulating ring is to provide a means whereby the unit may be supported in any convenient position, and it also provides means for carrying a binding post, such as that shown at 19. The latter is connected by a lead 20, which is welded to the shell 10'. A binding post 21 is connected with the shell 10, as shown in Fig. 5.

In order to insulate the elements from the conducting casing, which, as stated, is made of metal with radiating fins, I provide strips of asbestos or similar thermal insulation 22, which of course is placed in position before the unit is sealed.

A unit constructed as described has the following advantages. The shape of the elements with matched and enlarged ends reduces the electrical resistance of the junctions and it also allows these elements to be stacked compactly, so that when the ends are compressed, the resulting electrical contact between the enlarged ends is such that the resistance at these points is a minimum.

Formerly it was necessary to weld the junctions to secure a maximum conductivity or a minimum resistance, but the pressing of the elements together and the sealing of the elements under pressure obviates the necessity of welding and prevents the oxidation or corrosion of the elements. The charcoal also aids in preventing oxidation, since it absorbs air or gases, as stated.

Since the casing is sealed and since oxidation is prevented, elements can be used that would otherwise be unavailable where such oxidation is not prevented.

The compression of the ends which form the joints also renders the cement more dense and in addition to making a rigid assembly it increases the thermal conductivity of the cement.

Due also to the poor thermal conductivity of the elements and the excellent thermal conductivity of the cement used, the two materials approximate each other in thermal conductivity and make the end sections of uniform thermal conductivity.

The plating or coating of the elements as described, to reduce their electrical resistance, allows the elements to be selected for their thermoelectric and mechanical qualities, so that the electrical conductivity of the elements becomes a secondary consideration. The shaping of the elements with the enlarged ends and the offset elements enables a maximum difference of temperature to be maintained across the ends. It will be noted in this connection that the body portion of the elements, i. e., that portion between the enlarged ends, may be made of unequal width or thickness or both, as illustrated in Figs. 1 and 2.

In those figures illustrating the assemblies, no attempt has been made to show the difference in thickness or width, since in actual practice the elements are of such small dimensions that such difference will not be noticed in the illustration.

The construction described provides an assembly of elements in which the intermediate portions between the ends are not tightly compressed and this allows for expansion and contraction due to heating and cooling. The casing as described, consists of two parts separated thermally and electrically, but united mechanically. The corrugated shell of the extension on one side of the insulating ring is preferably made of iron or silicon steel or similar material selected to withstand the heat to which it is exposed, without excessive oxidation or deterioration. The main body portion on the opposite side of the ring, has a shell which is made of aluminum or similar material that is an excellent conductor of heat and readily absorbs and dissipates heat. The radiating fins, as stated, aid in this radiation of heat.

The insulating ring or band which separates the extensions from the main body portion may serve to mount the unit in any desired position. Any suitable means for heating the corrugated extension might be used and in connection therewith the opposite end of the assembly may be cooled, as by immersing it in water. The insulating ring adds mechanical strength to the unit and is itself resistant to heat. The cement used in the insulating ring is primarily for making an air-tight seal and for thermally insulating the body portion of the unit from the extension. Since this cement is enclosed in a shell little mechanical stress is placed on it.

It will be understood that while I have specified certain elements for thermo-couples, any suitable elements may be used because of the fact that the electrical and thermal conductivity may be equalized as heretofore pointed out. The assembly, made as described, may be used for measuring temperatures, operating temperature alarms, and other uses to which thermo-couples are put. The efficiency is high and the electrical output large. There is one feature to which I desire to call attention, and that is the inherent "storage effect." Even after the removal of heat the current will continue to flow, and it will require some time for the opposite ends of the assembly to become of equal temperature due to the volume of material in the hot and cold ends respectively. One feature of this assembly is that the internal heat loss is at a minimum.

This assembly, due to its design, can be used efficiently for cooling purposes. Its low electrical resistance is an aid in this connection, since by passing the current from an external source through the device, the junction of the dissimilar metals is cooled.

In order to make a more economical use of heat, two or more assemblies of elements may be mounted in one shell. In Fig. 9 I have shown such a construction in which two sets of elements indicated generally at A and B are grouped together. The intervening space is filled with cement, as shown at 23. This cement is of the same type as that used between the thermo-couple junctions. In order to connect the sections A and B electrically I make use of small conducting plates or thin metal strips 24, thus connecting the sections in parallel electrically. In order to compress the junctions of the elements at this point, I use two insulating disks of hard material 25. The exterior casing is shown at 26 and the casing for the separated extension or heating head is shown at 27. The insulating ring shown generally at R serves the same purpose as that already described in connection with Figs. 5 and 6. The radiating fins $11x$ in this instance serve for carrying out the heat from both sections. This assembly provides a rigid construction in a single casing and greatly adds to the output and efficiency of the device.

In utilizing the device usually more than one converter is arranged in a group so that a larger volume of current may be secured with a given amount of heat. For instance, in Fig. 11, a tubular support 31 is provided, the same being metal or other desired material. Heat is passed through this tube and heats the respective extensions 10' of the respective converters 32, 33, 34 and 35. By arranging the parts as just described, the heat is confined as far as possible to the extensions 10', so that the remaining part of the converters will be subjected to the cooling actions of air so as to maintain a difference in temperature between the respective ends of the converters. It will be understood that current may be drawn off from any one individual converter for independent use, or the converters may be arranged in multiple or in series, or in series-multiple, without departing from the spirit of the invention. These converters may be fastened in place in any desired manner, but, as shown, are attached through the medium of the insulating rings R'. This arrangement has been found to be very efficient where the cold ends are maintained cold by air. However, under some circumstances a greater efficiency and a greater amount of current are desired. When this is the case the respective converters 38, 39 and 40 could be used, as shown in Fig. 12, with the extension 10' projecting into a heater 41 which may be of any desired kind. The opposite or cold ends of the converters are submerged into a cooling liquid 42 carried by a receptacle 43. This cooling liquid may be water, which is fed into the receptacle 43 through a pipe 44 and withdrawn through a pipe 45. As the converters are watertight, as illustrated in Fig. 6, the cold ends may be readily submerged in a cooling element and thereby produce exceptionally good results.

Under some circumstances, instead of making a rectangular structure, a circular structure may be provided as indicated in Fig. 13. This structure is desirable where there is to be a centrally positioned heating means which may provide heat through an opening 46. It will be observed that each of the elements in this structure is provided with a ring 47 and with a number of sections or bars 48, either covered or provided with a small strip of electrical conducting material 49. The respective sections or bars 48 of the rings merge into an inner ring 50. It will be observed that the negative and positive rings and bars are formed identical but the bars 48 of one element are offset so as to be halfway between the bars of the other element. In this form of the invention a suitable circular casing must be provided and the insulation arranged substantially as shown in Fig. 6.

In Fig. 14 a further modified form of the invention is shown wherein there is disclosed a pile or stack of elements. Each of the elements is provided with two end bars 51 and 52 and with connecting sections 53, the connecting section 53 of one element being arranged between the connection 53 of the next adjacent element. Each of these sections is covered with silver, copper, or other electrical conducting material in the same manner as the elements shown in Figs. 3 and 4 are covered. This arrangement similar to the arrangement shown in Fig. 9, is merely to provide a greater amperage in a given converter.

After the parts have been fully constructed and assembled and arranged as shown in Figs. 11 and 12, all that is necessary to cause the device to function is to provide heat at the hot end, namely, the end H. Current may then be tapped off as illustrated in Figs. 6 and 8. This current will continue as long as the heat is applied and if the temperature between the ends H and K is constant, the current provided will be constant. The current produced will be a direct current and may be utilized for any desired period.

In case it should be desired to use alternating current for heating the ends H, direct current will be produced by the converter. However, under most circumstances, it is desirable to use some other form of heat besides the heat of an electrical current and to convert the same into electrical energy. In some cases an arrangement might be provided, as shown in Fig. 11, and sunglasses used for focusing the sun on the respective ends H to secure the heat therefrom. This would produce direct current the same as heat produced from any other source.

In the constructions described herein it is generally best to use relatively poor conductors, since in doing so a greater difference in temperature is maintained, due to the poor heat conduction. I have found that it is possible to use very thin conductors, but by coating one, or both of the pairs of mating elements, the electrical and thermal conductivity may be equalized.

The cross sectional area between the end is not necessarily of the same amount, since the plating may be thicker on one than on the other.

In using the fused magnesia it may be spread on powdered or mixed with a suitable adhesive, such as water glass, in a thin solution, and may be applied like paint, by spraying or brushing or it may be compressed into wafer-like form, and be laid in place between the ends of the elements.

I claim:—

1. In a thermoelectric converter, a plurality of pairs of elements, each consisting of a positive element and a negative element spaced laterally from the positive element, the positive elements having enlarged ends offset in the direction of the negative elements and the negative elements having enlarged ends offset in the direction of the positive elements, the ends of each pair being in registration and electrical connection at one end, and being in registration and insulated from each other at the other end.

2. In a thermoelectric converter, a plurality of pairs of elements, each pair consisting of a negative and a positive element spaced laterally from the negative element, each element having an enlarged offset end, the ends of the negative elements being offset toward the positive element and the ends of the positive elements being offset toward the negative elements, the offset ends being in registration and in superposed relation, each pair of elements being in electrical connection at one end and being insulated at the other end, and the adjacent pair being in electrical connection at the latter end.

3. In a thermoelectric converter, a plurality of pairs of elements, each pair consisting of a positive and a negative element in laterally spaced parallel relation, each element having an enlarged offset end, the ends of the negative elements being offset toward the positive elements and the ends of the positive elements being offset toward the negative elements, the offset ends being in registration and in superposed relation, each pair of elements being in electrical connection at one end, an insulating material disposed between the connected ends of the adjacent pairs at one end, the opposite ends of the pairs being in electrical connection with one of the elements of adjacent pairs, and electrical insulation disposed between the laterally spaced elements.

4. In a thermoelectric converter, a plurality of pairs of elements, each pair consisting of a positive and a negative element in laterally spaced parallel relation, each element having an enlarged offset end, the ends of the negative elements being offset toward the positive elements and the ends of the positive elements being offset toward the negative elements, the offset ends being in registration and in superposed relation, each pair of elements being in electrical connection at one end, an insulating material disposed between the connected ends of the adjacent pairs at one end, the opposite ends of the pairs being in electrical connection with one of the elements of adjacent pairs, electrical insulation disposed between the joints formed by the contacting elements of the adjacent pairs, the superposed ends of the elements and the insulation being under compression, and means for maintaining the compression.

5. In a thermoelectric converter, a plurality of pairs of elements, each pair consisting of a positive and a negative element, each element having an enlarged offset end, the ends of the negative elements being offset toward the positive elements and the ends of the positive elements being offset toward the negative elements, the offset ends being in registration and in superposed relation, each pair of elements being in electrical connection at one end, an insulating material disposed between the connected ends of the adjacent pairs at one end, the opposite ends of the pairs being in electrical connection with one of the elements of adjacent pairs, electrical insulation of good thermal conductivity disposed between the joints formed by the contacting elements of the adjacent pairs, the superposed ends of the elements and the interposed insulation being under compression, and means for maintaining the compression.

6. In a thermoelectric converter, a plurality of superposed pairs of elongated elements, each pair consisting of dissimilar metals, the members of each pair being joined at one end of the assembly and having electrical connection at the opposite end of the assembly to the adjacent pair whereby a group of junctions is effected at each end of the assembly, a metal casing for containing the elements and one of said groups of junctions, an extension of said metal casing for containing the other of said group of junctions electrically insulated from said first named casing, and an insulating ring for holding the casing and its extension in mechanical connection.

7. In a thermoelectric converter, a plurality of superposed pairs of elongated elements, each pair consisting of dissimilar metals, the members of each pair being joined at one end of the assembly and having electrical connection at the opposite end of the assembly to the adjacent pair whereby a group of junctions is effected at each end of the assembly, a metal casing for containing the elements and one of said groups of junctions, an extension of said metal casing for containing the other of said group of junctions electrically insulated from said first named casing, an insulating ring for holding the casing and its extension in mechanical connection, insulating means between adjacent junctions and between superposed elements, and means for preventing deterioration of the elements.

8. A thermoelectric converter including a plurality of pairs of units stacked, a metal casing for said units, said casing containing said units in a compressed condition so that the ends thereof will remain in contact, said casing being divided near one end so that the divided part will present a heating head, a circuit connector carried by said head, means for taking off current from the opposite end, and means adjacent the heating head for carrying a vertical support during the time heat is applied to said heating head.

9. A thermoelectric converter including a plurality of elements forming pairs of couples arranged so that current will flow in series through the various couples, a pair of metal containers having their edges in confronting but spaced relationship, said containers tightly fitting the ends of said couples to compress them and make thorough electrical contacts and providing a casing for all of the couples, one of the containers comprising a heat-radiating body and the other container comprising a heating head, and means by which the foregoing structure may be supported, said means fixedly joining said containers but maintaining them in thermally and electrically spaced relationship.

10. In a thermoelectric converter, a plurality of pairs of elements, each pair consisting of a positive and a negative element, the positive elements being in laterally spaced relation with respect to the negative elements and each of said elements having enlarged ends offset toward the elements of opposite sign, the offset ends being in interposed relation, a metal casing for containing the body portion and one end of each of said elements, a metal extension of said casing for containing the other ends of said elements, said extension being spaced from the casing, and an insulating ring for maintaining the extension and the casing in spaced electrical and thermal relation.

11. In a thermoelectric converter, a plurality of pairs of elements, each pair consisting of a positive and a negative element, the positive elements being in laterally spaced relation with respect to the negative elements and each of said elements having enlarged ends offset toward the elements of opposite sign, the offset ends being in interposed relation, a metal casing for containing the body portion and one end of each of said elements, a metal extension of said casing for containing the other ends of said elements, said extension being spaced from the casing, an insulating ring for maintaining the extension and the casing in spaced electrical and thermal relation, said insulating ring having corrugated stiffening members imbedded in insulating cement, exterior porcelain-like plates, and means for clamping the insulating material between said plates.

12. In a thermoelectric converter, a plurality of pairs of elements, each consisting of a positive element and a negative element spaced laterally from the positive element, the positive elements having enlarged ends offset in the direction of the negative elements and the negative elements having enlarged ends offset in the direction of the positive elements, the ends of each pair being in registration and electrical connection at one end and being in registration and insulated from one another at the other end, porous insulating material disposed between the negative and the positive elements, and means carried by said porous insulating material for absorbing gases within the converter.

HERSCHEL G. PACK.